United States Patent Office 3,522,075
Patented July 28, 1970

3,522,075
PROCESS FOR COATING GLASS WITH AN ORGANOPOLYSILOXANE
Robert Henry Kiel, Weston, Ohio, assignor to Owens-Illinois, Inc., a corporation of Ohio
No Drawing. Filed Sept. 9, 1966, Ser. No. 578,137
Int. Cl. C03c 17/22, 17/30; B32b 17/06
U.S. Cl. 117—72               4 Claims

ABSTRACT OF THE DISCLOSURE

There is disclosed the coating of a glass substrate with an organopolysiloxane resin composition wherein at least one metal compound is applied to a glass surface, e.g., by spraying or coating, and pyrolyzed at an eleavted temperature so as to prime the surface with a thin layer of metal oxide and then the resin composition is applied to the metal oxide primed surface. The glass surface is primed with metal oxide in an amount sufficient to substantially increase the permanency of adhesion of the organopolysiloxane to the surface. Organopolysiloxane as used herein is defined as including both modified and non-modified resins.

---

This invention relates to a novel process of applying an organopolysiloxane resin-based coating composition to a glass surface such as a glass container including bottles, ware, tumblers, and the line. More particularly, this invention relates to a process for coating or decorating a glass surface with an organopolysiloxane composition having increased adhesion and improved resistance to water and caustic solutions.

Prior to the discovery of this invention, poor adhesion was obtained when a glass surface was coated with an organopolysiloxane resin-based coating composition, especially when the coating was exposed to humid or wet conditions or when the coated glass surface was soaked in hot caustic solution, for example as in the sterilization of glass bottles.

In accordance with the practice of this invention, a modified or non-modified organopolysiloxane resin-based coating composition is applied to a glass surface in the presence of at least one metal oxide, said metal oxide being present in an amount sufficient to substantially increase the permanency of adhesion of the coating to the glass.

In accordance with a specific embodiment of this invention, a glass surface is first coated or primed with a thin layer of metal oxide by pyrolyzing at least one metal compound on the surface of the glass at an elevated temperature, and then applying a resin-based coating composition to the glass surface.

In such embodiment the metal compound is applied to the glass surface at a pyrolyzing temperature at least sufficient to bind the resulting metal oxide to the surface, but below the deforming temperature of the glass; that is, the temperature at which the glass will deform under its own weight.

For high alkali silicate glasses used in the manufacture of bottles, the metal compound is typically applied to the glass surface at temperature of about 600° F. to about 1200° F.

Pyrolysis as used herein is defined as the chemical decomposition of the metal compound by the action of heat including the formation of the metal oxide layer by auxiliary mechanisms such as hydrolysis or oxidation. Preferably, the pyrolysis is conducted in the presence of suitable hydrolyzing and/or oxygenating agents so as to aid such auxiliary mechanisms. Where the pyrolysis is conducted in an atmospheric environment, the normal water vapor in the air (in conjunction with the oxygen therein) will usually suffice to initiate the formation of the metal oxide.

In the practice of this invention, it is contemplated using any organic or inorganic metal compound(s) or metal containing compound(s) which will pyrolyze at an elevated temperature, e.g. about 600° F. to about 1200° F., to form a thin, tightly adherent, substantially colorless, transparent layer of metal oxide on the glass surface. Typically the pyrolyzable metal compound is applied to the surface in an amount sufficient to provide a layer of metal oxide having a thickness of about one micron, preferably less than one micron.

Metal oxide as used herein includes the so-called metalloid oxides. Typical metal oxides contemplated herein include not by way of limitation the oxides of tin, titanium, zirconium, vanadium, aluminum, iron, cobalt, hafnium, nickel, palladium, zinc, gallium, silver, and rare earths such as lanthanum and thorium, including mixtures of same.

Among the titanium-containing compounds suitable for purposes of the present invention are the alkyl titanates, preferably wherein the alkyl group contains from 1 to about 8 carbon atoms, and including tetrabutyl titanate, tetraisopropyl titanate, tetraethylhexyl titanate and the like. Also included among the suitable titanium-containing compounds are the titanium tetrahalides, and particularly titanium tetrachloride.

The tin compounds that may be used for the purpose of the present invention include both stannous and stannic compounds. Among the suitable stannic compounds are the stannic halides, and the alkyl stannic carboxylates. The stannic halide may be exemplified by stannic chloride, stannic bromide, and stannic iodide. The alkyl stannic carboxylates have the general formula (I)            $(R_1)_x Sn(OOCR_2)_y$ wherein $R_1$ and $R_2$ are alkyls and wherein $x$ and $y$ are whole numbers from 1 to 3, the sum of which is equal to four. The alkyls may be branched or straight chain. $R_2$ preferably contains from 1 to 18 carbon atoms and can be stearate, palmitate, laurate, or the like. $R_1$ preferably contains 1 to 8 carbon atoms, and may be methyl, propyl, butyl, isopropyl, isobutyl, hexyl, octyl or the like. Included among the many compounds coming within the scope of the foregoing are dibutyl tin diacetate, dipropyl tin diacetate, dioctyl tin diacetate, dibutyl tin distearate, dibutyl tin dipalmitate, dibutyl tin dilaurate, dibutyl tin maleate and the like.

Among the stannous tin compounds suitable for the purposes of this invention are the stannous dihalides, such as stannous chloride, stannous bromide, stannous iodide and the carboxylic acid salts of stannous tin. The latter include compounds having the formula (II)

$$Sn(-O-\overset{O}{\underset{\|}{C}}-R)_2$$

wherein R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl, or the like. Among the carboxylic acid salts suitable for the purpose of this invention are stannous oleate, stannous palmitate, stannous stearate, stannous caproate, stannous laurate, stannous naphthenate, stannous tartrate, stannous gluconate, stannous acetate, and the like. It is to be understood that any titanium or tin compound may be used in forming the initial coating on the glass, provided that such a compound is capable of forming an oxide on the glass surface at the reaction temperature indicated. Like compounds of the other metals are also contemplated.

In the practice of this invention, it is contemplated applying the selected pyrolyzable metal compound to any suitable glass surface including an article of manufacture such as a bottle, jar, tumbler, or other container as well as sheet glass.

Suitably the article is treated with the metal compound after the article leaves a glass forming machine and before the article is conveyed to an annealing lehr; that is, while the surface of the article is still at a temperature sufficient to pyrolyze the compound. After the metal compound has been conveniently applied (e.g. by spraying) to the exterior of the hot glass usrface and the metal oxide layer formed thereon, the article is cooled by passing it through a lehr. The cooled article is then coated with an organopolysiloxane resin-based composition.

In the practice of this invention, it is contemplated using either a solid or liquid organopolysiloxane resin.

Organopolysiloxane compounds which are particularly suitable for use in the practice of this invention may be produced by the hydrolysis and condensation of at least one alkoxysilane compound having the formula:

(III) $\qquad T_nSiZ_{(4-n)}$ wherein T independently represents a member selected from alkyl, cycloalkyl, alkenyl, and aryl; Z independently represents an alkoxy group and $n$ is 1.

Representative alkyl, cycloalkyl, alkenyl, and aryl members contemplated for T in Formula III are methyl, ethyl, propyl, butyl, pentyl, hexyl (both normal and isomeric forms), cyclopentyl, cyclohexyl, vinyl, the normal and isomeric forms of propentyl through hexenyl, and phenyl.

Representative alkoxy groups for Z are methoxy through heptoxy.

In accordance with this invention, it is contemplated hydrolyzing and condensing one alkoxysilane as represented by Formula III or a mixture of two or more such alkoxysilanes.

It has been discovered in the practice of this invention that preferred results are obtained with the methyltrialkoxysilanes (where T is methyl in Formula III). Such methyltrialkoxysilanes may be used alone as disclosed in copending U.S. patent application Ser. No. 370,684 filed May 27, 1964 by Burzynski and Martin, and now abandoned or in conjunction with other alkoxysilanes, especially the phenyltrialkoxysilanes as disclosed in copending U.S. patent application Ser. No. 306,344, filed Sept. 3, 1964 by Burzynski and Martin, and now abandoned.

The methyltrialkoxysilanes and phenyltrialkoxysilanes contemplated herein include compounds of the formulae $CH_3Si(OR)_3$ and $C_6H_5Si(OR)_3$, wherein R represents a monovalent alkyl radical of less than five (i.e. 1–4) carbon atoms. Examples of such methyltrialkoxysilanes are methyltrimethoxysilane, methyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silane, phenyltri(2-propoxy)silane, phenyltri(2-methyl - 2 - propoxy)silane, phenyltri(1-butoxy)silane, and phenyltri(2-butoxy)silane.

It is further contemplated that there may be used a mixture of trifunctional alkoxysilanes as represented by Formula III and up to 5 mole percent, based on the total silane reactants, of mono or difunctional alkoxysilanes (where $n$ equals 2 or 3 in Formula III) as disclosed in said copending U.S. patent applications 370,684 and 306,344.

Specific examples of mono and difunctional alkoxysilanes (where $n$ equals 2 or 3 in Formula III) include trimethylmethoxysilane, tri(1-methylethyl)ethoxysilane, di(1-methylpropyl)diethoxysilane, divinyldipropoxysilane, diphenyldiethoxysilane, propylpentylmethoxyethoxysilane, methylallyldi(-1-methylethoxy)silane, vinylphenyldimethoxysilane, ethyltriethoxysilane, (1-methylethyl)trimethoxysilane, (1,1 - dimethylethyl)tripropoxysilane, hexyltriethoxysilane, and vinyltriethoxysilane.

Also in accordance with the practice of this invention, the organopolysiloxane resin-based coating composition may comprise compatible pigments, dyes, fillers, wetting agents, and dispersing agents in addition to the organopolysiloxane resin. Such pigments, dyes, fillers, wetting agents, and dispersing agents are typically incorporated into the composition prior to the completion of the polymerization of the alkoxysilane; that is, before the complete conversion of the alkoxysilane(s) to the organopolysiloxane resin.

The actual polymerization conditions, for example temperature and concentration, will depend upon the particular alkoxysilane(s) used as the base starting material and the type of organopolysiloxane resin required. Reference is made to U.S. Reissue Pat. 23,060, U.S. Letters Patents 2,456,783 and 2,397,895, and M. M. Sprung and F. O. Guenther, J. Am. Chem. Soc. 77, 4173, 6045 (1955) for procedures suitable to convert alkoxysilanes, especially methyltrialkoxysilanes, as comonomers with other alkoxysilanes to a variety of non-transparent but useful liquid and solid organopolysiloxane resins.

In a further embodiment of this invention, the glass surface is coated or decorated with a *transparent* organopolysiloxane resin-based coating composition. Procedures for preparing such transparent resins are disclosed in copending U.S. applications 370,684 and 306,344, supra, and copending U.S. application Ser. No. 545,579, filed Apr. 27, 1966 by Burzynski and Martin, and now Pat. 3,395,117, which procedures are incorporated herein by reference.

Organopolysiloxane coatings which have been applied to a glass surface in accordance with this invention typically retain adhesion to the surface even when soaked for 10 minutes in a hot caustic solution, e.g. a three (3) percent by weight aqueous solution of NaOH at 160° F. Organopolysiloxane coatings not applied in accordance with this invention exhibit total failure of adhesion under the same test conditions.

The hereinafter examples represent two of the best modes contemplated by the inventor in the practice of this invention.

EXAMPLE I

A tetrabutyl titanate solution consisting of one part by volume of titanate and two parts by volume of anhydrous n-butanol was prepared by dissolving the titanate ester at room temperature in the solvent.

The solution thus obtained was sprayed (using compressed air) onto the exterior surface of soda lime glass bottles at the rate of one gallon per hour as the bottles were continuously being conveyed from the glass-forming machine to the annealing lehr.

The composition of the soda lime glass (used in the making of the bottles) was about 71.54 percent by weight $SiO_2$, 1.41 percent by weight $Al_2O_3$, 11.1 percent by weight CaO, 2.70 percent by weight MgO, and 13.23 percent by weight $K_2O$ and $Na_2O$.

The surface temperature of the bottles was 1100° F. and the titanate was pyrolyzed almost immediately as evidenced by the formation of a clear, transparent coating which was observed upon the surface of the bottles.

The bottles were cooled by passing through an annealing lehr and the cooled bottles coated with an organopolysiloxane resin-based coating composition using a hot melt silk screen process as described in copending U.S. patent application Ser. No. 534,518, filed Mar. 15, 1966, and now abandoned.

The organopolysiloxane resin-based coating composition was initially prepared by melting at about 120° C. one hundred (100) grams of biphenyl and one hundred (100) grams of a heat-softenable organopolysiloxane resin powder (prepared in accordance with the procedure of Example VIII in copending U.S. application Ser. No. 545,579, filed Apr. 27, 1966). One hundred (100) grams of rutile $TiO_2$ was stirred into the hot melt and the resulting mixture passed over a three-roll mill at about 148° C.

The coated bottles were heated at about 260° C. in an oven for six (6) minutes to cure the organopolysiloxane resin.

After curing of the resin, the bottles were cooled to ambient temperature. The cured resin-coating was found to be highly resistant to washing with methyl ethyl ketone.

The coating was further tested by soaking in three (3) percent by weight aqueous NaOH at 160° F. for about 10 minutes. The coating was then tested by means of an adhesive tape (Scotch tape—registered trademark) applied to the coated glass bottle surface. The coating adhered permanently to each bottle surface with only a small portion of the coating being detectable on the applied adhesive tape.

For comparison soda lime bottles (not coated with titanium oxide) were coated with the same coating composition. The bottles were tested using the caustic soak test. The coating on these bottles exhibited total failure.

EXAMPLE II

The procedure of Example I was repeated except that stannic chloride ($SnCl_4$) was used instead of tetrabutyl titanate. Again the resulting organopolysiloxane coating composition exhibited good permancy of adhesion when tested with methyl ethyl ketone and caustic.

Although this invention has been found to be particularly suitable for coating the surface of soda lime glass typically used in the manufacture of containers such as glass bottles, it also is suitable for coating the surface of other glass compositions. Accordingly, although the invention has been illustrated with reference to specific embodiments, it will be obvious to those skilled in the art that other embodiments and modifications hereof can be made within the scope and spirit of the invention.

I claim:
1. In a process for applying an organopolysiloxane resin composition to a glass surface, the improvement which comprises pyrolyzing at least one metal compound on the glass sruface at an elevated temperature so as to prime the surface with a thin layer of metal oxide and then applying the organopolysiloxane resin composition to the metal oxide primed surface, the metal oxide being present in an amount sufficient to substantially increase the permanency of adhesion of the organopolysiloxane resin to the surface and the organopolysiloxane being produced by the hydrolysis and condensation of at least one alkoxysilane having the formula $TSiZ_3$ wherein T is selected from alkyl, cycloalkyl, alkenyl, or aryl and Z is an alkoxy group.

2. The process of claim 1 wherein the metal oxide is selected from oxides of tin, titanium, zirconium, vanadium, aluminum, iron, cobalt, hafnium, nickel, palladium, zinc, gallium, silver, and the rare earths.

3. The process of claim 1 wherein the metal compound is a tin compound selected from inorganic or organic, stannic or stannous halides.

4. The process of claim 1 wherein the metal compound is sprayed onto the glass surface.

References Cited

UNITED STATES PATENTS

| | | | |
|---|---|---|---|
| 2,577,936 | 12/1951 | Waggoner | 117—54 X |
| 2,593,818 | 4/1952 | Waggoner | 117—69 X |
| 3,323,889 | 6/1967 | Carl et al. | 117—72 X |
| 3,352,708 | 11/1967 | Lyon et al. | 117—72 |
| 3,368,915 | 2/1968 | Carl et al. | 117—72 |
| 3,379,559 | 4/1968 | Gerhardt | 117—72 |

WILLIAM D. MARTIN, Primary Examiner

D. COHEN, Assistant Examiner

U.S. Cl. X.R.

117—54, 124